(12) United States Patent
Khanna et al.

(10) Patent No.: US 11,572,296 B1
(45) Date of Patent: Feb. 7, 2023

(54) METHOD FOR EXTENDING TIME OF ACTIVITY OF CHLORITE-BASED BIOCIDES

(71) Applicant: Bio-Cide International, Inc., Norman, OK (US)

(72) Inventors: Neeraj Khanna, Norman, OK (US); Benjamin J. Whyatt, Norman, OK (US); James P. Ringo, Norman, OK (US); Roberta Reed, Oklahoma City, OK (US)

(73) Assignee: BIO-CIDE INTERNATIONAL, INC., Norman, OK (US)

( * ) Notice: Subject to any disclaimer, the term of this patent is extended or adjusted under 35 U.S.C. 154(b) by 0 days.

(21) Appl. No.: 16/838,870

(22) Filed: Apr. 2, 2020

(51) Int. Cl.
*C02F 1/76* (2006.01)
*A01N 59/00* (2006.01)
*C02F 103/10* (2006.01)

(52) U.S. Cl.
CPC .............. *C02F 1/76* (2013.01); *A01N 59/00* (2013.01); *C02F 2103/10* (2013.01); *C02F 2303/04* (2013.01); *C02F 2303/08* (2013.01)

(58) Field of Classification Search
CPC ............... C02G 1/76; C02G 2103/10; C02G 2303/04; C02G 2303/08; A01N 59/00
See application file for complete search history.

(56) References Cited

U.S. PATENT DOCUMENTS

| | | | |
|---|---|---|---|
| 3,386,915 A * | 6/1968 | Gehring | C01B 11/024 |
| | | | 210/754 |
| 4,945,992 A | 8/1990 | Sacco | |
| 5,084,210 A * | 1/1992 | Teeters | C09K 8/54 |
| | | | 252/392 |
| 6,431,279 B1 | 8/2002 | Zaid | |
| 6,602,442 B1 * | 8/2003 | Pitochelli | A01N 59/00 |
| | | | 252/186.1 |
| 7,897,063 B1 | 3/2011 | Perry | |
| 8,962,534 B2 | 2/2015 | Mitchell | |
| 9,238,587 B2 | 1/2016 | Mason | |
| 9,862,603 B1 | 1/2018 | Cochran | |
| 10,442,711 B2 | 10/2019 | Mason | |
| 2007/0298979 A1 | 12/2007 | Perry | |
| 2009/0008238 A1 * | 1/2009 | Williams | A61L 2/20 |
| | | | 204/157.48 |

FOREIGN PATENT DOCUMENTS

| | | | |
|---|---|---|---|
| AU | 2002301921 | | 8/2008 |
| AU | 2011244788 | | 10/2012 |
| JP | 2000063217 A | * | 2/2000 |
| KR | 20110074402 A | * | 6/2011 |

* cited by examiner

*Primary Examiner* — Ali Soroush
(74) *Attorney, Agent, or Firm* — Nyemaster Goode P.C.

(57) ABSTRACT

This invention relates to the use of chlorite-based antimicrobials in a manner where the time of biocidal activity is extended for the microbial control in the water used for drilling, completion and remediation of wells. The invention involves mixing of a compatible extender in the form of sodium chlorate with sodium chlorite to form an antimicrobial formulation. This combination is used with an acid on the site to generate chlorine dioxide which is injected into the water used for hydraulic fracturing or remedial workover. The formulation is a much more effective bactericide for the subterranean oil and gas rich formations. The potency and longevity of biocidal activity is controlled by varying the ratios of chlorate and acid which provide different profiles of the antimicrobial activities.

19 Claims, 1 Drawing Sheet

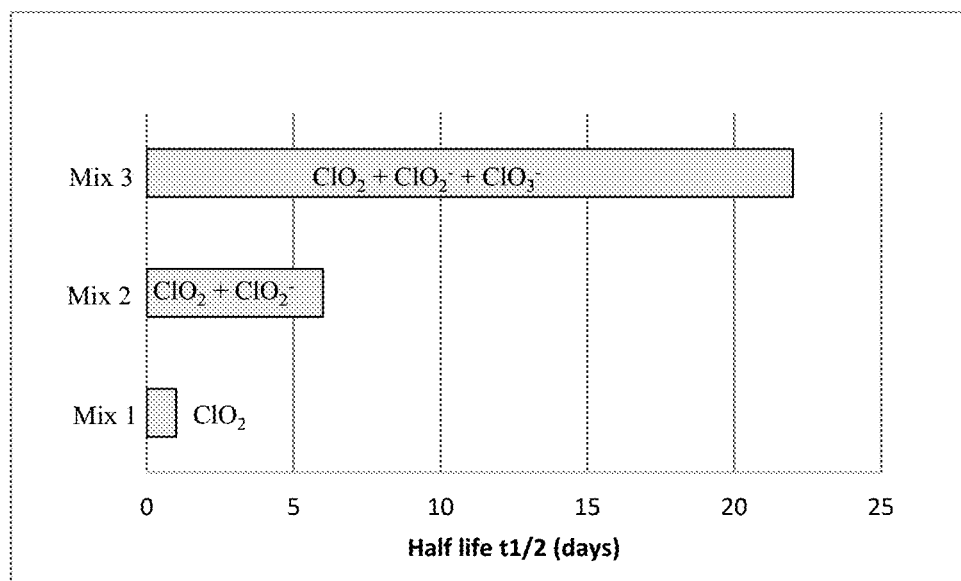

METHOD FOR EXTENDING TIME OF ACTIVITY OF CHLORITE-BASED BIOCIDES

CROSS-REFERENCE TO RELATED APPLICATIONS

This application claims the benefit of U.S. provisional application No. 62/919,867 entitled "Method for Extending Time of Activity of Chlorite Based Biocides," filed Apr. 2, 2019, the contents of which are incorporated herein by reference.

FIELD OF INVENTION

The present invention relates to a new formulation used for antimicrobial intervention of water used in and produced from oil and gas formations.

BRIEF DESCRIPTION OF THE DRAWING

The accompanying drawing is incorporated into and forms a part of the specification and is used to explain one or more embodiments of the present invention.

FIG. 1 is table showing the relative life span of various combinations of biocidal constituents.

DETAILED DESCRIPTION OF THE PREFERRED EMBODIMENT(S)

Oxidizing biocides have limited life due to the reactive nature of the oxidizing molecules. Sodium chlorite is used as precursor for generation of chlorine dioxide which is a classic oxidizing antimicrobial used for the sanitation of water and food. Due to the highly reactive nature of chlorine dioxide, it is generated onsite by mixing sodium chlorite with different types of acids. The generalized reaction is as follows:

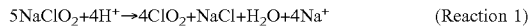
$$5NaClO_2 + 4H^+ \rightarrow 4ClO_2 + NaCl + H_2O + 4Na^+ \quad \text{(Reaction 1)}$$

Chlorine dioxide is short-lived in the matrix, where its half-life ranges from a few seconds to few minutes depending on the other reactive species in the system. For example, in subterranean oil and gas formations, which is a common use-site for chlorine dioxide, the presence of sulfides, ferric compounds, and residual fracking gels can rapidly react with $ClO_2$ reducing its concentration down to zero. In these situations, the residual chlorite ion provides a second layer of activity where it is known to act as a bactericidal agent. Furthermore, chlorite ion also has limited life due to its reactivity with sulfides, ferric compounds and friction reducing agents.

The current invention involves a formulation and method for preparing a longer acting biocide that can be used to treat water used for hydraulic fracturing, as well as for well remediation. The formulation is prepared by preparing an aqueous solution of sodium chlorite and sodium chlorate in the weight ratio from about 25:1 to about 1:5, respectively. In particularly preferred embodiments, the ratio is from about 2:1 to about 1:1. This aqueous solution will serve as the concentrated precursor solution. The product can be shipped as a mixture of from 5 to 15% sodium chlorite and from 2 to 10% sodium chlorate. Therefore, for example, a preferred embodiment will be a product containing a mixture of 10% sodium chlorite and 5% sodium chlorate.

At the site, the concentrated precursor is mixed with a Brønsted-Lowry acid and allowed to react for an incubation period of from about 1 to about 10 minutes to generate chlorine dioxide. The preferred weight ratio of acid to precursor is 1:5, but can range from 1:20 to 1:2, depending on the desired level of chlorine dioxide to be pre-generated. Particularly preferred acids include hydrochloric acid and citric acid at concentrations ranging from 2.5 to 15% and 8 to 50%, respectively. Other suitable acids include sulfuric, nitric, acetic and formic acids. The reacted solution is then added to the water to be treated at a rate of from about 0.01 to about 5 GPT ("gallons per thousand gallons of water), and most preferably from about 0.2 to about 1.0 GPT. The presently preferred rate is 0.5 GPT. The potency and longevity of biocidal activity for this formulation is controlled by varying the ratios of chlorate and acid which provide different profiles of the antimicrobial activities. The increased proportion of chlorine dioxide will increase the antimicrobial potency of the formulation providing instant kills within seconds, whereas the increased proportion of sodium chlorate will extend the longevity of the antimicrobial properties for weeks to months. The antimicrobial impact of sodium chlorite falls in the range of hours to days.

The process of mixing the concentrated precursor with acid, allowing to react and adding to the water to be treated can be accomplished automatically using commercially available hydraulic proportioning equipment that is specifically designed for such a purpose. Such equipment is described in detail in U.S. Pat. No. 9,862,603 which is incorporated herein by reference.

Optionally, sodium chloride or potassium chloride may be added to the concentrated precursor solution to adjust for salinity in an amount from about 1 to 20% by weight. The preferred concentration of such salinity adjusting constituents is about 10% by weight, but persons skilled in the art will recognize that greater or lesser amounts may be used depending on the particular site conditions.

The kinetics of the reaction of the chlorite ion with the potentially reactive species in the subterranean formations, are much faster than that of the chlorate ion. Therefore, after chlorite is reacted out, there is residual chlorate left in the formulation to continue to produce low levels of chlorine dioxide.

The primary benefit of the formulation comes into play when the said formulation is partially reacted with acid. In this case, the unreacted chlorite and chlorate ions are left in the system by design. These unreacted ions provide residual activity for long periods of time. In moderately clean produced water, chlorite activity is detected for 4-7 days. Chlorate ion lasts for much longer times periods i.e., 10 to 45 days. This time is shortened or lengthened based on the presence of other species in the system.

$$NaClO_3 + H^+ \rightarrow ClO_2 + H2O \quad \text{(Reaction 2)}$$

It is well known that the rate constant for Reaction 2 ($k_2$) is much lower than that of Reaction 1 ($k_1$).

At higher concentrations of acid the reaction starts to generate chlorine gas.

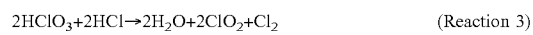
$$2HClO_3 + 2HCl \rightarrow 2H_2O + 2ClO_2 + Cl_2 \quad \text{(Reaction 3)}$$

With excess hydrochloric acid at elevated temperatures chlorine gas is the primary product.

$$2HClO_3 + 10HCl \rightarrow 6H_2O + 6Cl_2 \quad \text{(Reaction 4)}$$

Addition of reducing agents such as methanol can lead to much faster production of $ClO_2$.

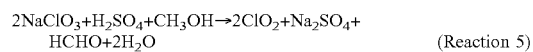
$$2NaClO_3 + H_2SO_4 + CH_3OH \rightarrow 2ClO_2 + Na_2SO_4 + HCHO + 2H_2O \quad \text{(Reaction 5)}$$

The compatibility of the said mixture was well studied and was observed to have a long shelf-life. With sodium being the spectator ion, the acid reacted solution primarily contains the following three oxychloro species:

i) Chlorine dioxide=$ClO_2$
ii) Chlorite ion=$ClO_2^-$
iii) Chlorate ion=$ClO_3^-$ The order of the antimicrobial activity of these oxychloro species from highest to lowest is:

$ClO_2 > ClO_2^- > ClO_3^-$

The order of reactivity of the three oxychloro species from highest to the lowest is: $ClO_2 > ClO_2^- > ClO_3^-$ Therefore, the expected $t_{1/2}$ for the three species in the matrix, in the order of highest to lowest is:

$ClO_3^- > ClO_2^- > ClO_2$

The chlorate ion is expected to lengthen the time of antimicrobial activity.

TABLE 1

Properties of oxychloro species

| Parameter | $ClO_2$ | $ClO_2^-$ | $ClO_3^-$ |
|---|---|---|---|
| Biocidal potency | high | moderate | low |
| Neutralization kinetics | fast | slow | very slow |
| Oxidation potential | 0.95 V | 0.78 V | 0.63 V |
| Half-life in reaction matrix | short | moderate | long |
| Photosensitivity | high | moderate | low |

Chlorine dioxide is a free radial with an unpaired electron in the outer octet. Such molecules tend to be very reactive by nature. These molecules tend to oxidize the substrates that include all types of bacteria, at a rapid rate. There are many research papers that hypothesize that the bacterial cell wall implodes as a result of oxidation of essential membrane protein. The mechanism of antimicrobial kill of chlorite ion is not clear, however, it is speculated that it does form chlorine dioxide at the molecular level as a result of reaction with proton that is formed during bacterial multiplication. This explains the well-recognized bacteriostatic properties of the chlorite molecule. A similar mechanism could be predicted for the chlorate ion, however, at the rates that are much more sluggish.

Oil formations as well as the materials used in the pumping setup are known to harbor bacteria that are classified into three categories: sulfate reducing, acid producing and general aerobes. The inventions described here effectively kills all categories of the subject bacterial populations. The advantage of the said invention is that after the primary kill that is performed by the most potent component of the formulation, namely chlorine dioxide, the other two ingredients, namely chlorite ion and the chlorate ion continue to be present and active. Whereas the consumption rate of chlorine dioxide is rapid, the consumption rate of chlorite and chlorate ions is relatively much slower. Although the antimicrobial power of the latter ions does not match up to that of chlorine dioxide, high antimicrobial efficacy is not as much required after the initial, rapid and broad-spectrum kill is imparted by chlorine dioxide. Simply the prevention of the regrowth of bacterial population is adequate after the initial rapid kill step from chlorine dioxide. Therefore, the biocidal power of the solution becomes a less significant parameter, and the time extension of the biocidal activity becomes the important and desirable criterion. This is where the slow consumption of chlorate ion is most beneficial since it extends the time of biocidal activity.

Due to the abundance of sulfate ion in the subterranean formations, sulfate reducing bacteria (SRB) grow prolifically downhole. Evidence exists that the enzyme nitrate reductase found in SRB converts the chlorate ion to chlorite which is lethal to the bacterium. Therefore, the presence of chlorate ion in antimicrobial formulations can be of high utility in oilfield operations making this invention particularly valuable.

Example 1:

Sample of the contaminated flow back water from the Permian Basin of West Texas region was obtained and treated with two different formulations to evaluate their respective efficacy on oilfield bacteria. Formulation 1 contained 40 ppm of sodium chlorite (commercial concentrate known as Petro-Flo™). Formulation 2 contained 40 ppm of sodium chlorite and 20 ppm of sodium chlorate (formulation known as Petro-Plus). Both formulations were mixed with 20% of 5M hydrochloric acid prior to treatment to obtain some chlorine dioxide (as show in FIG. 1.) to accomplish the initial kill.

Bacterial growth media bottles were used to quantify the bacterial population. By means of the composition of these media bottles one can distinguish three different kinds of bacteria that commonly exist in the oilfield formations. These three kinds are known as general aerobic bacteria (GAB), acid-producing bacteria (APB), and sulfate-reducing bacteria (SRB). Phenol Red Dextrose broth media is used to grow GAB; APB anaerobic media conditions is used to grow APB. API RP38 sulfate reducer media is an anaerobic formula recommended by The American Petroleum Institute to grow SRB; it is used in conjunction with a small iron nail that provides the source of $Fe^0$. By method of serial dilution, these bottles can be used to enumerate microorganisms. All media bottles contain 1% NaCl to simulate the natural salinity of the tested samples of water.

A 1.0 mL sample of water was used to inoculate the first media bottle in the serial dilution series. The media bottle was then mixed by inverting. Subsequently, 1.0 mL was transferred to the second media bottle in the series. This step was repeated until all media bottles in the series were inoculated. The media bottles were then incubated at room temperature for 21 days and visually examined for color change that indicates growth. Indicators present in the media bottles signaled a color change for positive bottles. Bottles with no growth retained its original color. GAB and APB bottles turned from red to yellow when these bacteria were present and viable. SRB bottles turned from clear to black if sulfate-reducing bacteria were present and viable in the sample. Each positive bottle would be equivalent to 1 log CFU/mL. The results are summarized in the Tables 1 and 2 below.

TABLE 1

Log kill for 24-hr treatment with acid activated Petro-Flo ™ and Petro-Plus

|  | GAB | APB | SRB |
|---|---|---|---|
| Control | 5 | 5 | 5 |
| Petro-Flo ™ | 1 | 1 | 0 |
| Petro-Plus | 0 | 0 | 0 |

TABLE 2

Log kill for 6-days treatment with acid activated
Petro-Flo ™ and Petro-Plus

|            | GAB | APB | SRB |
|------------|-----|-----|-----|
| Control    | 5   | 5   | 2   |
| Petro-Flo ™| 1   | 2   | 0   |
| Petro-Plus | 0   | 0   | 0   |

The results demonstrate that Petro-Flo™ formulations provide a good kill on all bacteria types however, does not eliminate the counts of GAB and APB regardless of the time of contact of the product to the contaminated water. In both cases of contact of 24 hours as well as 6 days Petro-Flo™ does show some growth in the 1-log range on GAB and APB. On the other hand, Petro-Plus eliminates the entire bacterial population regardless of the type of bacteria showing a zero count. Therefore, it could be concluded that the addition of chlorate ion increases the effectiveness of the formulation over a long range of contact.

Example 2:

In another experiment, sample of the contaminated flow back water from the Permian Basin of West Texas region was treated with two different formulations which were much less potent than those used in Example 1. Formulation 3 contained 16 ppm of sodium chlorite (formulation known as Petro-Flo U). Formulation 4 contained 16 ppm of sodium chlorite and 8 ppm of sodium chlorate (Petro-Flo Plus U). No acid was added to any of these formulations to eliminate the presence of chlorine dioxide (refer to FIG. 1).

Petro-Plus U resulted in a 2-log reduction in GAB whereas the Petro-Flo U only gave a 1-log reduction under the same conditions. The data summarized in Table 3 demonstrates that addition of chlorate ion in the formulation provided additional kill over longer period of time.

TABLE 3

24-hours treatment with unactivated
Petro-Flo and Petro-Plus

|              | GAB | APB | SRB |
|--------------|-----|-----|-----|
| Control      | 5   | 5   | 5   |
| Petro-Flo U  | 4   | 3   | 2   |
| Petro-Plus U | 3   | 3   | 2   |

Example 3:

The formulation in this invention that comprises a mixture of sodium chlorite with sodium chlorate can be quantified with a combination of titrations. The first titration quantifies the chlorite content. This titration method uses an iodometric procedure where sample is mixed with potassium iodide and hydrochloric acid. The chlorite component oxidizes iodide to iodine which is titrated with sodium thiosulfate and the sodium chlorite concentration is calculated.

The second titration analyzes the total quantity of sodium chlorite and sodium chlorate. This titration entails mixing the sample with ferrous sulfate and a combination of phosphoric and sulfuric acids. This mixture is then prepped by boiling followed by cooling. The prepped mixture is then titrated with standardized potassium permanganate. The combined sodium chlorite and sodium chlorate oxidant concentration is calculated by comparing it with a blank sample where the oxidant sample is not used and only ferrous sulfate is mixed with the combination of sulfuric and phosphoric acids in the exact same proportion as used with the sample in earlier steps.

Subtracting the chlorite concentration (obtained from the first titration) from the results of second titration yields the sodium chlorate concentration.

It will be clear that the present invention is well adapted to attain the ends and advantages mentioned as well as those inherent therein. While presently preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A composition useful for treating water used in oil and gas operations comprising an aqueous solution of sodium chlorite and sodium chlorate in the weight ratio of from about 2:1 to about 1:1 and citric acid wherein the acid to sodium chlorite and sodium chlorate ratio is from about 1:20 to about 1:2, said composition providing chlorite activity in the water for a time period of about 4-7 days.

2. The composition of claim 1 further comprising salinity adjusting compound of from 1 to 20% by weight.

3. The composition of claim 2 further comprising a corrosion inhibitor.

4. The composition of claim 2 further comprising an ionic or non-ionic surfactant.

5. The composition of claim 2 wherein the salinity adjusting compound is sodium chloride.

6. The composition of claim 2 wherein the salinity adjusting compound is potassium chloride.

7. A method for treating water used in oil and gas operations comprising:
    providing an aqueous precursor solution of sodium chlorite and sodium chlorate in the weight ratio of from about 2:1 to about 1:1;
    adding citric acid to the precursor solution in a ratio of from about 1:20 to about 1:2 and allowing the solution to react for a period of time to generate chlorine dioxide; and
    adding the reacted solution to the water to be treated for use in the well;
    wherein the reacted solution provides chlorite activity in the water for a time period of about 4-7 days.

8. The method of claim 7 further comprising the step of adding a salinity adjusting compound selected from the group consisting of sodium chloride and potassium chloride.

9. The method of claim 8 wherein the salinity adjusting compound is added to a concentration of from about 1 to about 10% by weight.

10. The composition of claim 1 comprising 8-50% by weight citric acid.

11. The composition of claim 1 comprising only one Bronsted-Lowry acid.

12. The method of claim 7 whereby the reacted solution comprises 8-50% by weight citric acid.

13. A composition useful for treating water used in oil and gas operations comprising an aqueous mixture of sodium chlorite and sodium chlorate in the weight ratio of from about 25:1 to about 1:5 and citric acid wherein the acid to sodium chlorite and sodium chlorate ratio is from about 1:20 to about 1:2, wherein the composition comprises from 8-50% by weight citric acid, said composition providing chlorite activity in the water for a time period of about 4-7 days.

14. The composition of claim 1, wherein said composition provides chlorate activity in water for a time period of at least 22 days.

15. The composition of claim 1, wherein said composition provides chlorate activity in water for a time period of about 22 to 40 days.

16. The method of claim 7, wherein said composition provides chlorate activity in water for a time period of at least 22 days.

17. The method of claim 7, wherein said composition provides chlorate activity in water for a time period of about 22 to 40 days.

18. The method of claim 13, wherein said composition provides chlorate activity in water for a time period of at least 22 days.

19. The method of claim 13, wherein said composition provides chlorate activity in water for a time period of about 22 to 40 days.

* * * * *